Jan. 4, 1949. A. H. REDDING 2,457,833
CARTRIDGE STARTER FOR COMBUSTION GAS TURBINES
Filed Feb. 3, 1943
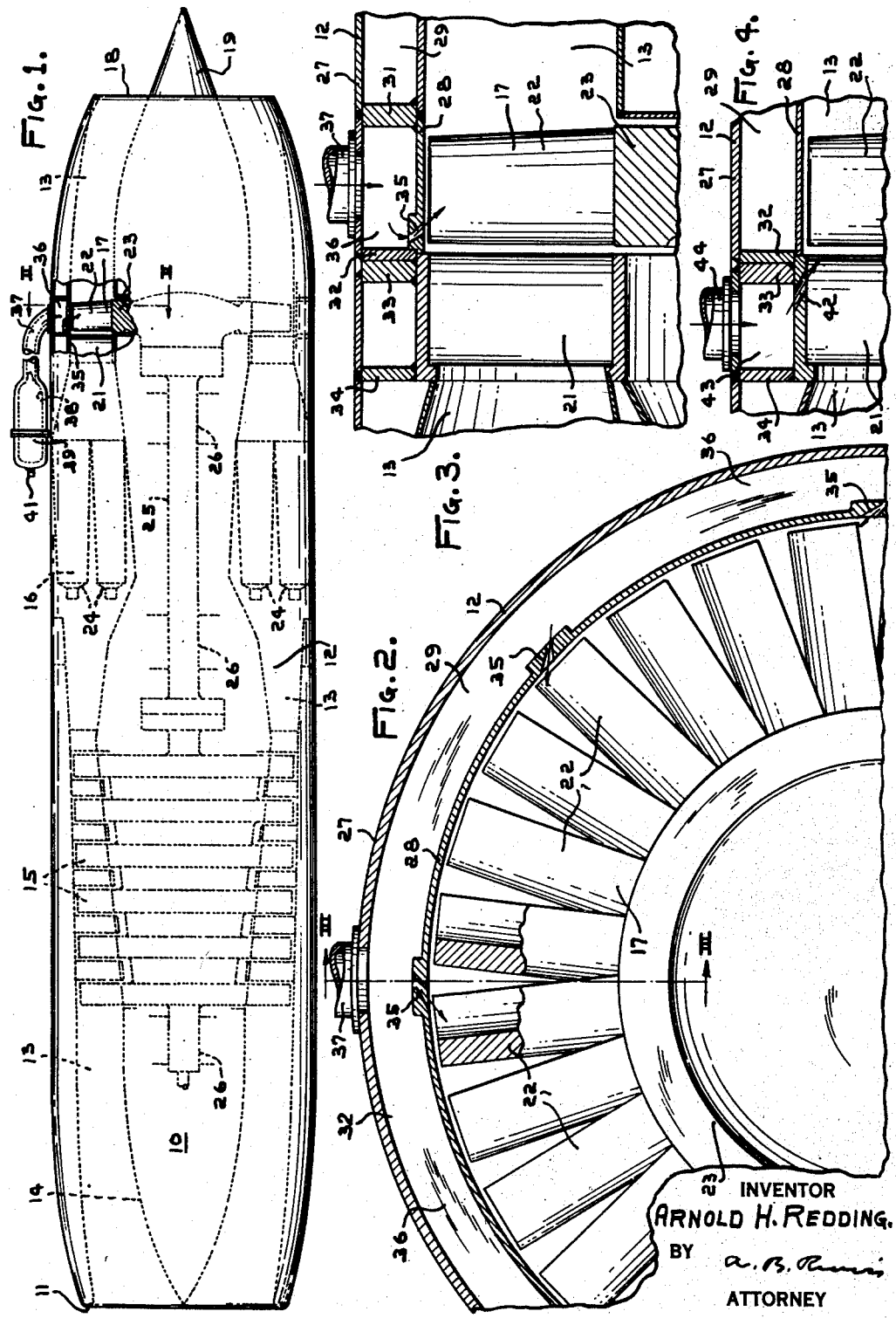
INVENTOR
ARNOLD H. REDDING.
BY
ATTORNEY Patented Jan. 4, 1949

2,457,833

UNITED STATES PATENT OFFICE 2,457,833

CARTRIDGE STARTER FOR COMBUSTION GAS TURBINES

Arnold H. Redding, Swarthmore, Pa., assignor to Westinghouse Electric Corporation, East Pittsburgh, Pa., a corporation of Pennsylvania Application February 3, 1943, Serial No. 474,522

3 Claims. (Cl. 60—49)

This invention relates to power plants and particularly to a gas turbine power plant which may be used for effecting propulsion of aircraft at high speeds.

In order to propel aircraft at high speeds, it has been proposed to employ a power plant functioning on the nonregenerative Joule cycle. Such a power plant may include an air compressor, a combustion apparatus, and a gas turbine compactly arranged in series to keep the weight, overall length and diameter of the unit at a minimum. These parts may be built into the wing of an aircraft or mounted centrally within and supported by an outer casing of streamline form which directs the flow of air through the power plant.

The turbine is driven by the hot gases provided by the compressor and combustion apparatus and extracts at least sufficient power from these gases to drive the compressor. The remainder of the available power may be utilized to propel the aircraft by ejecting the gases from a propulsion jet rearwardly of the turbine.

Since the power plant relies on the power supplied by the turbine to operate the air compressor and fuel pumps, it is not self-starting and some means must be provided for initially rotating the turbo compressor shaft.

It is accordingly an object of the invention to provide an improved starting arrangement for a power plant of the character mentioned.

These and other objects are effected by the invention as will be apparent from the following description and claims taken in connection with the accompanying drawings, forming a part of this application, in which:

Fig. 1 is a side elevational view of a power plant, with a portion of the outer casing broken away, in which the present invention has been incorporated;

Fig. 2 is an enlarged sectional view taken substantially on the line II—II of Fig. 1;

Fig. 3 is a sectional view taken substantially on the line III—III of Fig. 2; and, Fig. 4 is a view corresponding to Fig. 3 illustrating a modification of the invention.

The power plant shown in Fig. 1 and generally indicated 10 is adapted to be mounted in or on the fuselage or wings of an airplane with the left or intake end 11, as viewed in this figure, pointed in the direction of flight. The power plant comprises an outer shell or casing structure 12 providing an air duct 13 extending fore and aft with respect to the aircraft. This casing has mounted therein along its longitudinal axis, a nose portion 14 in which fuel and lubricating oil pumps and ignition apparatus may be supported, an axial flow compressor 15, combustion apparatus generally indicated at 16, a turbine 17 and a propulsion jet 18 defined by the casing 12 and a tailpiece 19 mounted concentrically therein. Air enters at the intake end 11, flows through the compressor 15 where it is compressed, and into the combustion apparatus where it is heated. The heated compressed air leaving the combustion apparatus is directed by suitable guide vanes or nozzles 21 against the blades 22 carried on the periphery of a turbine rotor 23 and then discharged through the propulsion jet 18.

The combustion apparatus 16 may be of any suitable construction and is here shown as comprising a plurality of flared burner tubes 24 arranged circularly within the casing. These tubes may be provided with openings (not shown) in the walls thereof through which the compressed air supplied by the compressor may enter and mix with fuel oil or the like supplied to the burners. A suitable ignition means (not shown) for igniting the fuel and air mixture, may be provided for each burner.

The compressor rotor and turbine rotor are mounted on the common shaft 25 journaled in suitable bearings, generally indicated 26, supported interiorly from the outer casing structure 12.

The present invention is not limited to the details or arrangement of the structure thus far described but it is primarily concerned with means for initially starting the power plant.

In the particular embodiment illustrated in Figs. 1 to 3, inclusive, the casing structure 12 comprises spaced inner and outer walls 27 and 28 providing a space 29 therebetween. These walls are tied together by means of spaced ring members 31, 32, 33, and 34 which may be welded thereto and serve to increase the rigidity of the casing.

The wall 28 overlies the tips of the turbine rotor blades and is provided with a series of suitably directed nozzles 35 for supplying gas at high velocity against the rotor blades. The nozzles preferably communicate with the annular space or nozzle chamber 36 defined between the spaced rings 31 and 32 and supplied by an inlet pipe 37. The gas may be obtained from any suitable source. For example, an explosive cartridge 38, such as disclosed in the patent to Winston R. New, No. 2,411,552, issued November 26, 1946, and assigned to the assignee of the present invention, may be used.

While the invention is not limited thereto, the cartridge 38 may be mounted in a suitable holder 39 connected to the inlet pipe 37 and provided with a suitable firing mechanism such as the firing pin 41.

Upon firing the cartridge, the gas formed therein passes through the pipe 37 into annular space 36 and is then expanded through the nozzles 35, arranged circumferentially about the rotor blade tips, to provide motive fluid issuing therefrom at high velocity and directed so as to secure rotation of the blades. Gas exhausting from the blades is discharged through the jet 18. It will be understood that the charge of the cartridge should be sufficient to operate the turbine to provide heated and compressed motive fluid adequate to render the plant self-operating.

In Fig. 4, starting nozzles 42, corresponding to the nozzles 35, are shown communicating with a second annular space 43 defined between the spaced rings 33 and 34. The starting gas under pressure is supplied to this space through an inlet pipe 44 and directed by the nozzles 42 located between the stationary guide vanes 21 against the rotor blades 22 for starting of the turbine. This embodiment has the advantage of permitting the gas to act on the full width of the rotor blades in starting and is desirable where such blades have a shroud ring.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In combination with a gas turbine power plant comprising a stator and rotor with the rotor carrying at least one row of axial flow blading and the stator including inner and outer structures providing an axial flow annular passage, and apparatus within said annular passage and driven by said rotor for supplying motive fluid to said blading for driving the rotor; of starting means for the plant comprising a circumferential row of nozzles formed in said outer structure outward of said blading, said nozzles being arranged to direct a gas at high velocity against said blading to secure rotation of said rotor independently of said motive fluid, and means for supplying gas under pressure to said nozzles, said last-mentioned means including an annular chamber carried by said structure and means utilizing a cartridge to provide gas under pressure for said chamber.

2. In the combination set forth in claim 1 wherein said nozzles and annular passage are concentric with and in the plane of said blading.

3. In combination with a gas turbine power plant comprising a stator and a rotor with the rotor carrying at least one row of axial flow blading and the stator including inner and outer structures providing an axial flow annular passage and having first nozzle means supported therein and axially aligned with said blading for directing a motive fluid against said blades to drive said rotor, and apparatus within said annular passage and driven by said rotor for supplying motive fluid to said nozzles; of starting means for the plant comprising a circumferential row of starting nozzles formed in said outer structure radially outward of said first nozzle means, said starting nozzles being arranged to direct a gas through said first-mentioned nozzles against said blading to secure rotation of said rotor independently of said motive fluid, and means for supplying gas under pressure to said nozzles, said last-mentioned means including an annular chamber carried by said structure and means utilizing a cartridge to provide gas under pressure for the chamber.

ARNOLD H. REDDING.

REFERENCES CITED

The following references are of record in the file of this patent:

UNITED STATES PATENTS

| Number | Name | Date |
|---|---|---|
| 1,281,644 | Ostergren | Oct. 15, 1918 |
| 1,829,674 | Rosenlöcher | Oct. 27, 1931 |
| 1,884,479 | Woolson | Oct. 25, 1932 |
| 2,326,072 | Seippel | Aug. 3, 1943 |

FOREIGN PATENTS

| Number | Country | Date |
|---|---|---|
| 243,733 | Great Britain | July 8, 1926 |
| 264,541 | Great Britain | Apr. 7, 1927 |
| 274,101 | Great Britain | Aug. 18, 1927 |
| 288,217 | Great Britain | June 14, 1928 |
| 451,838 | France | Feb. 21, 1913 |
| 19,254 | France | Aug. 10, 1914 |
| | (Addition to No. 471,200) | |
| 21,665 | Denmark | Nov. 20, 1916 |